United States Patent

[11] 3,568,664

| [72] | Inventor | William F. Meriwether<br>1201 S. W. 21st Court, Fort Lauderdale, Fla. 33315 |
|---|---|---|
| [21] | Appl. No. | 798,589 |
| [22] | Filed | Feb. 12, 1969 |
| [45] | Patented | Mar. 9, 1971 |

[54] STOMACH TUBE SPECULUM
5 Claims, 3 Drawing Figs.

[52] U.S. Cl. ............................................. 128/14
[51] Int. Cl. .......................................... A61d 3/00, A61d 15/00
[50] Field of Search ............................................ 32/40; 128/12, 13, 14

[56] References Cited
UNITED STATES PATENTS
2,797,682   7/1957   Kannenberg ................ 128/12UX
2,920,616   1/1960   Girerd ......................... 128/12

FOREIGN PATENTS
704,007   4/1952   Great Britain ................ 128/12

Primary Examiner—Richard A. Gaudet
Assistant Examiner—Channing L. Pace
Attorney—John H. Oltman ABSTRACT: A feline stomach tube speculum in the form of a double-tapered wedge bar having an elongated central portion dimensioned to fit in and extend transversely across a cat's mouth, and two tip portions extending axially outwardly from the central portion and each tapering down to a narrow terminal edge. The central portion has one hole extending transversely through it for receiving a stomach tube and a pair of holes respectively on opposite sides of the tube hole and in substantially perpendicular relation to the tube hole for receiving the fangs of a cat. The tube hole is preferably parallel to the tip edges. The wedge bar also serves as a jaw opener.

PATENTED MAR 9 1971 3,568,664

INVENTOR.
WILLIAM F. MERIWETHER.
BY
John H. Oltman
ATT'Y.

STOMACH TUBE SPECULUM

BACKGROUND OF THE INVENTION

Although various types of jaw openers for use in handling and treating animals have been proposed, they have, in general, been awkward to use and rather complicated. So far as is known to applicant, no instrument has been available which is specifically designed to facilitate treatment of cats.

Frequent oral alimentation of cats is desirable for good nutrition and/or medication in a variety of conditions. It would be desirable to have an instrument which would facilitate the passage of a stomach tube while holding the jaws of a cat open. It would also be desirable if the instrument could be manipulated to wedge the jaws of a cat open.

SUMMARY OF THE INVENTION

The present invention provides a speculum having a wedge shape to facilitate opening the jaws of a cat and having an opening for receiving a stomach tube during oral alimentation. The speculum also has a pair of holes on opposite sides of the tube opening for receiving the fangs of a cat such that the jaws of a cat may be held closed on the speculum and the cat's fangs which are received in the fang openings act to retain the speculum in the proper position. A stomach tube can then be conveniently inserted through the tube opening. When properly positioned, the speculum virtually eliminates the hazard of the cat chewing the tube or the handler. It also eliminates the ability of the cat to use its tongue to divert the tube. The speculum may be made from plastic quite economically such that it may be made available commercially at low cost.

A preferred embodiment of the speculum is illustrated in the accompanying drawings, in which.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
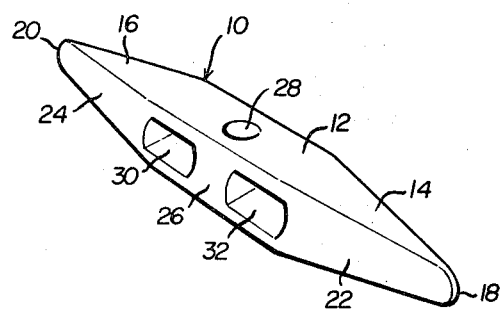
FIG. 1 is a perspective view of a speculum.

A speculum 10 is shown in FIG. 1. The speculum 10 comprises a double-tapered wedge bar having an elongated central portion 12 which is substantially square in cross section. The central portion 12 is dimensioned to fit in and extend transversely across a cat's mouth to hold a cat's mouth open slightly. Projecting axially from the central portion 12 are two tip portions 14 and 16, each of which tapers down in the outward direction to a narrow terminal edge 18 and 20. It may be seen in FIG. 1 that surfaces 22 and 24 extend at an angle with respect to central surface 26 and the corresponding surfaces on the opposite side of the speculum 10 have the same relationship.

The central portion 12 has a tube hole 28 extending transversely through it substantially parallel to the tip edges 18 and 20. The hole 28 serves to receive a stomach tube when the speculum is used for oral alimentation as will be described later. On opposite sides of the tube hole 28 are located two fang receiving holes 30 and 32 which extend transversely through the central portion 12 in substantially perpendicular relation to the tube hole 28. It would not be essential for the fang holes 30 and 32 to extend completely through the speculum, although this is preferred for a speculum of the dimensions desired for a cat.

The speculum 10 may be made from plastic material and may be manufactured economically by injection molding. It is constructed so as to be easy to use with a minimum possibility of injury to the cat's teeth or gums.

Figure 2:
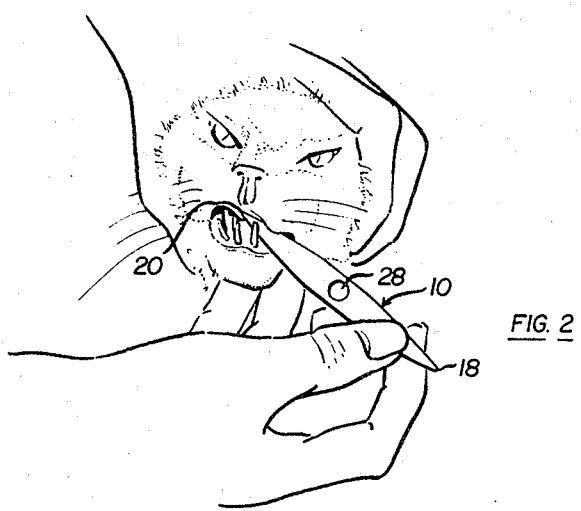
FIG. 2 shows the speculum of FIG. 1 being manipulated to wedge open the jaws of a cat.

As shown in FIG. 2, the double-tapered wedge shape of the speculum makes it easy to use the speculum as a wedge to open the jaws of a cat. In FIG. 2, the tip edge 20 has been inserted between the jaws of a cat, and the speculum may then be pushed to the left to insert the central portion 12 between the cat's jaws and at the same time spread the jaws of the cat due to the tapered shape of tip portion 16. The other end of the speculum could be used in the same manner.

Figure 3:
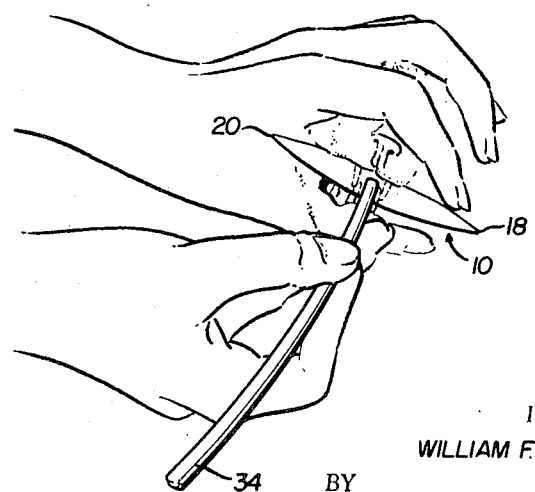
FIG. 3 illustrates the speculum of FIG. 1 in position between the jaws of a cat with a stomach tube being inserted through the tube opening of the speculum.

Once the speculum has been fully inserted so that the central portion 12 is between the jaws of the cat, the fangs of the cat may be placed in the openings 30 and 32 and the cat's jaws are then held closed gently but firmly to rest comfortably on the speculum. As shown in FIG. 3, a stomach tube 34 may be passed easily through the tube opening 28 for purposes of alimentation. Since the fangs of the cat are positioned in the openings 30 and 32, they act to hold the speculum 10 in the proper position while the tube is being inserted. The cat cannot chew on the tube or the handler, and it cannot use its tongue to divert the tube as is the case when no speculum is used.

I claim:

1. A stomach tube speculum, comprising a double-tapered wedge bar having an elongated central portion dimensioned to fit in and extend transversely across the mouth of an animal which has fangs projecting farther than teeth between the fangs, said wedge bar further having two tip portions projecting axially outwardly in opposite directions from said central portion, each of said tip portions tapering down progressively from said central portion to a narrow edge for insertion in the mouth of the animal progressively until said central portion is located in the mouth of the animal thereby spreading the jaws, said central portion having a first hole extending through the same for receiving a stomach tube and having second and third holes therein on opposite sides of said first hole for receiving the fangs of the animal, said first hole being substantially parallel to said edges and said second and third holes being substantially perpendicular to said first hole and extending at least about halfway through said bar.

2. The speculum as claimed in claim 1 in which said second and third holes extend completely through said bar.

3. The speculum as claimed in claim 2 in which said central portion of said wedge bar is substantially squared in cross section.

4. The speculum as claimed in claim 1 in which said wedge bar is made of plastic material.

5. A feline stomach tube speculum, comprising a wedge bar having an elongated central portion dimensioned to fit in a cat's mouth and extend transversely thereof, said wedge bar further having two tip portions projecting longitudinally outwardly in opposite directions from said central portion and each tapering down from said central portion to a narrow edge for insertion in the mouth of a cat whereby further insertion of said bar places said central portion in the cat's mouth to spread the jaws of the cat, said central portion having a tube hole extending through the same for receiving a stomach tube, and said central portion further having a pair of apertures on opposite sides of said tube hole for receiving a cat's fangs, said tube hole being generally parallel to said edges and said apertures being generally perpendicular to said tube hole and extending completely through said bar.